Feb. 8, 1966 F. J. L. TURNER 3,233,840

TAPE WINDING APPARATUS

Filed April 1, 1963 2 Sheets-Sheet 1

Inventor
FREDERICK J. L. TURNER
By [signature]
Attorney

Inventor

FREDERICK J. L. TURNER

By Percy P. Lantzy

Attorney

United States Patent Office 3,233,840
Patented Feb. 8, 1966

3,233,840
TAPE WINDING APPARATUS

Frederick James Leslie Turner, Croydon, England, assignor to Creed & Company Limited, Croydon, England, a British company Filed Apr. 1, 1963, Ser. No. 269,403
Claims priority, application Great Britain, Apr. 30, 1962, 16,381/62
6 Claims. (Cl. 242—67.1)

This invention relates to improvements in or relating to tape winding apparatus.

In data processing and teleprinter systems it is a practice to coil lengths of perforated or magnetic tape into the form of a figure 8. This is a rapid method of forming lengths of tape into neat packs which are easily stored and ready for use. Further advantages of tape coiled in this manner are that tape may be fed directly to, for example, a tape reader from either end of the coil, and that it is able to uncoil freely as it is fed through the tape reader, even at very high speeds.

It is an object of the present invention to provide tape winding apparatus for coiling tape in a figure of 8 form which tape, when removed from the apparatus, is sufficiently stable to handle without the risk of the coil disintegrating.

According to one aspect of the present invention therefore there is provided apparatus for mechanically winding tape in successive layers, each of which said layers is representative of a figure 8 in form.

According to another aspect of the present invention therefore there is provided apparatus for winding tape in successive layers, each of which said layers is representative of a figure 8 in form, and which said apparatus includes a member arranged to oscillate about an axis and parallel to the said axis, the combined effect of which said oscillations cause the tape to be drawn onto the member to form each one of the said successive layers in a figure of 8.

The invention will now be described in detail with reference to the accompanying drawings in which.

Figures 1, 2:
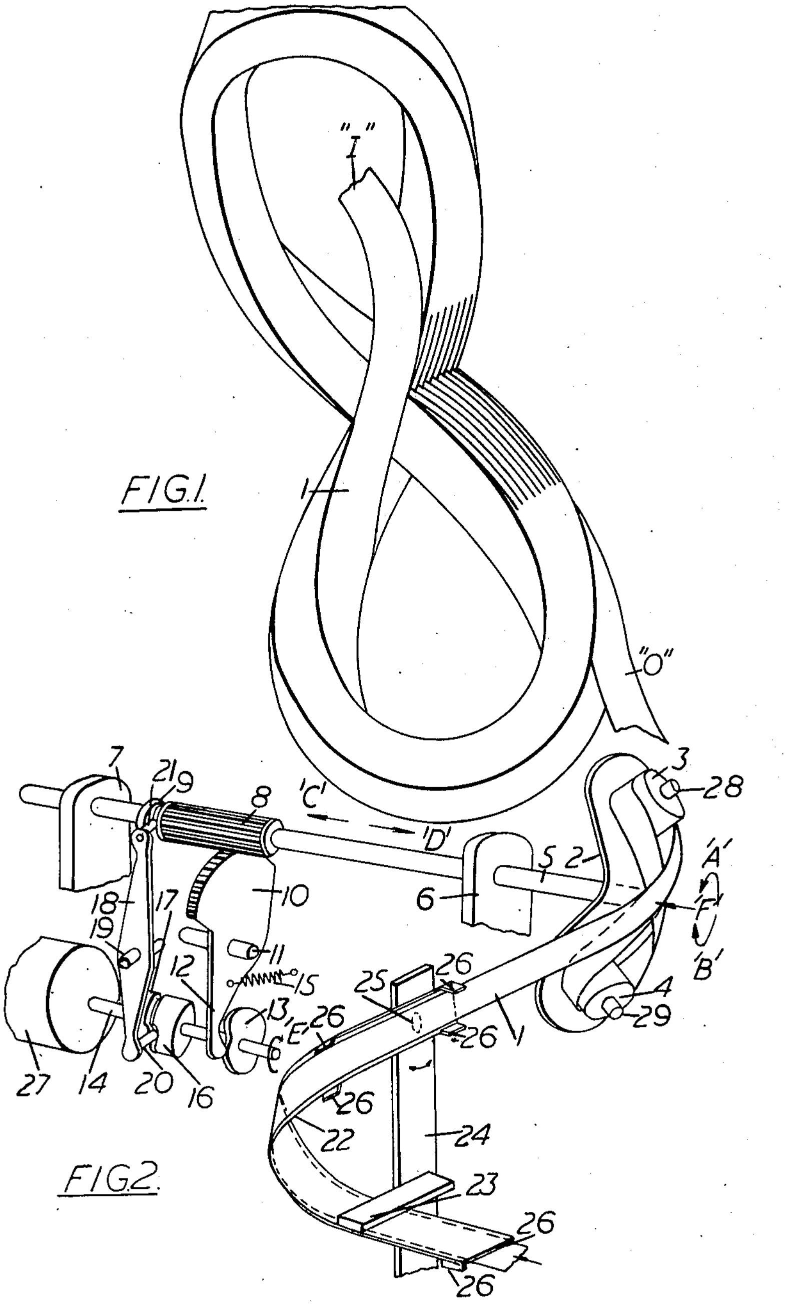
FIG. 1 shows a length of tape formed in a figure 8.
FIG. 2 shows an embodiment of the invention.

FIG. 1 shows tape 1 formed in a figure of 8 with the inner and outer ends designated "I" and "O" respectively. It will be noted that the tape between successive loops of tape interleave to form the coil as a whole and as produced by the apparatus now to be described with reference to FIGS. 2 and 3. An embodiment of this apparatus includes a member 2 (FIG. 2) and tape support members 3 and 4 which are carried on pins 28 and 29 affixed to member 2. Member 2 is carried on a shaft 5 which is rotatably supported in bearing brackets 6 and 7 which are rigidly affixed to the apparatus frame (not shown). Shaft 5 also carries thereon a pinion gear 8 one end of which is provided with an annular groove 9. Pinion 8 is engaged by a quadrant gear 10 pivotally mounted on a shaft 11 affixed to the apparatus frame. The quadrant gear 10 incorporates a cam following extension 12 which is arranged to engage the periphery of a cam 13 and maintained in engagement therewith by tension spring 15 affixed at its ends to the cam following extension 12 and to the apparatus frame. Cam 13 is affixed to and rotatable with a shaft 14 which is driven by motor 27 and which also accommodates thereon a member 16 having an annular groove 17 constituting a cam track. A lever 18, pivotally mounted on a shaft 19 which is affixed to the apparatus frame by means not shown, accommodates at each end thereon studs 20 and 21. Stud 20 engages in the cam track 17 of member 16 and constitutes a cam follower, stud 21 engages in annular groove 9 of pinion 8. It is the purpose of cam 13, when rotated by shaft 14, and via quadrant gear 11 and pinion 8, to cause shaft 5 to oscillate about its axis in the directions indicated by the arrows "A" and "B." It is the purpose of the cam track member 16 when rotated by shaft 14, via lever 18 and annular groove 9 in pinion 8, to cause shaft 5 to oscillate in the directions indicated by arrows "C" and "D."

A tape guide in the form of a bent and flexible metal strip 22 is provided to guide tape 1 from, for example, a bin to the member 2. The guide 22 is affixed at one position to a member 23 extending from a mounting bracket 24 which is in turn affixed to the apparatus frame. At another position the guide 22 is pivotally mounted on a pin 25 affixed to the mounting bracket 24, lugs 26 extending from the guide 22 are provided to retain the tape 1 within the bounds of the guide defined by its overall length and width.

Operation of the apparatus is now to be described with reference to FIGS. 2 and 3. Initially a free end of the tape 1 (FIG. 2) is drawn from either a tape perforator, reader, bin or other suitable storage device (not shown) and wound manually around support members 3 and 4 to form a number of layers each in the form of a figure 8. Only a sufficient number of layers need be formed in this manner to ensure that the tape will not readily fall off the support members due to lack of engagement therewith. The tape in the length following that applied to the support members is then arranged to engage the guide 22 as shown so that it may be drawn from the storage device and constrained to follow the path, to support members 3 and 4, defined by the guide. Motor 27 is then started and rotates shaft 14, in the direction indicated by the arrow "E," to drive cam 13 and cam-tracked member 16 in the same direction. In consequence cam 13, in its rotation, acts on cam-following extension 12 of quadrant gear 10 to cause the gear to pivot about the axis of shaft 11 in an anticlockwise direction. This pivoting of the quadrant gear 10 causes shaft 5, via pinion 8 engaging the quadrant gear 10, to rotate in the direction indicated by the arrow "B." Rotation of shaft 14 also causes lever 18, via stud 20 engaging in the cam track 17 of member 16, to pivot in a clockwise direction about the axis of pin 19. Stud 21 of lever 18, through its engagement in annular groove 9 of pinion 8, causes shaft 5 to move in the direction indicated by the arrow "C."

Figure 3:
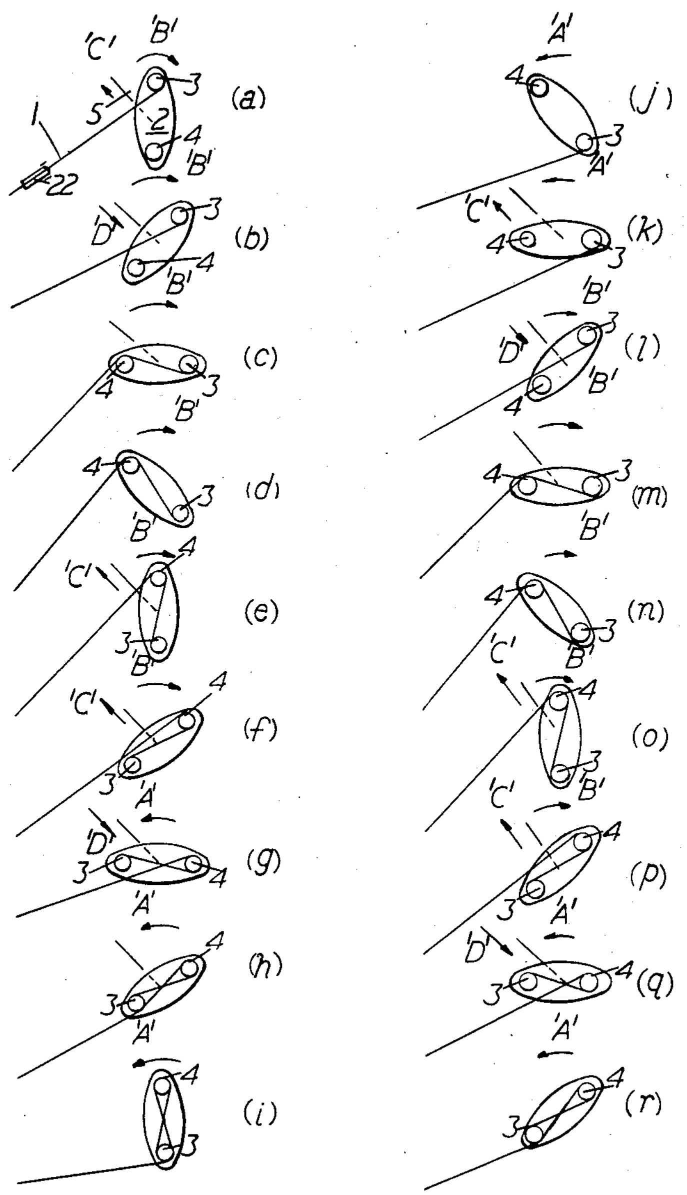
FIG. 3 shows in detail, a member of the embodiment of FIG. 2 at various positions in its cycle.

Referring now to FIG. 3(*a*) this figure shows a schematic view of member 2 with support members 3 and 4 thereon viewed from the direction indicated by the arrow "F" in FIG. 2, and shows the disposition of the tape 1 with respect to support member 3 and guide 22 at the instant the apparatus is started. For reasons of clarity the layers of tape applied by hand to support members 3 and 4 have not been shown in FIGS. 3(*a*) to (*r*) since these figures are illustrative of the manner in which the tape is drawn onto the support members 3 and 4 and show the stages of winding of two layers of tape. The arrows designated "A" and "B" and "C" and "D" of FIGS. 3(*a*) to 3(*r*) are illustrative of the directions of rotational and axial reciprocation respectively of member 2 on shaft 5, and these directions are complementary to the directions of reciprocation of the same designation shown in FIG. 2.

When the apparatus is started, and as previously stated, member 2 is caused to rotate in the direction indicated by the arrow "B" and is moved with shaft 5 in the direction indicated by the arrow "C" in FIG. 2. Rotation and movement of the member 2 continues until the member reaches the position shown in FIG. 3(*b*) at which time the direction of axial movement of shaft 5 and member 2 thereon is reversed so that they move in the direction indicated by the arrow "D."

Rotation of member 2 in the direction indicated by the arrow "B" continues until member 2 reaches the position shown in FIG. 3(*c*) at which time the tape 1 has been brought into contact with the tape of previously applied layers disposed around support member 4. Failure of shaft 5 to move the member 2 in the direction indicated by the arrow "D" up to this stage of operation would permit the tape 1 to pass by support member 4 in the next stage of rotation of member 2. Rotation of member 2 continues in the same direction but movement of shaft 5 with member 2 thereon ceases, in consequence the tape 1 is laid on tape of previous layers disposed around support member 4. Member 2 continues to rotate in the same direction past the position in which it is shown in FIG. 3(*d*) until it reaches the position shown in FIG. 3(*e*). At this time shaft 5 and mmeber 2 thereon are caused to move in the direction indicated by the arrow "C," and in continued rotation of member 2 in the same direction support member 3 is drawn, in the direction indicated by the arrow "C," clear of the path of the tape as member 2 moves through the position in which it is shown in FIG. 3(*f*) until it reaches the position shown in FIG. 3(*g*). Failure of shaft 5 to move member 2 in the direction indicated by the arrow "C" up to this stage of operation would permit the tape 1 to engage and be disposed around support member 3 in an anticlockwise direction instead of a clockwise direction. At the position shown in FIG. 3(*g*), rotation of member 2 in the direction indicated by the arrow "B" ceases and the direction reversed so that it rotates in the direction indicated by the arrow "A." Movement of shaft 5 and member 2 in the direction indicated by the arrow "C" ceases and the direction reversed so that they move in the direction indicated by the arrow "D." When member 2 reaches the position shown in FIG. 3(*h*), and the tape 1 comes into contact with the tape of previously applied layers disposed around support members 3, movement of shaft 5 and member 2 thereon in the direction indicated by the arrow "D" ceases. Member 2 continues to rotate to the position shown in FIG. 3(*i*) to lay the tape on layers of tape, previously disposed around the support member 4, in a clockwise direction. At this stage in the operation of the apparatus, a layer of tape in the form of a figure of 8 has been drawn onto the member 2 and supported by members 3 and 4.

In applying the second layer of tape 1, rotation of member 2 in the direction indicated by the arrow "A" continues through the position in which it is shown disposed in FIG. 3(*j*) until it reaches the position in which it is shown disposed in FIG. 3(*k*) during which time the tape 1 has been brought into contact with the tape of previously applied layer disposed around support member 3. When in the latter position shaft 5 and member 2 thereon are caused to move in the direction indicated by the arrow "C," and in continued rotation of member 2 in the same direction, support member 4 is drawn, in the direction indicated by the arrow "C," clear of the path of the tape 1 as member 2 moves through the position in which it is shown in FIG. 3(*p*) until it reaches the position shown in FIG. 3(*q*). At this position, rotation of member 2 in the direction indicated by the arrow "B" ceases and the direction reversed so that it rotates in the direction indicated by the arrow "A." Movement of shaft 5 and member 2 thereon in the direction indicated by the arrow "C" ceases and the direction reversed so that they move in the direction indicated by the arrow "D." When member 2 reaches the position shown in FIG. 3(*r*), and the tape 1 comes into contact with the tape of previously applied layers disposed around support member 3, movement of shaft 5 and member 2 thereon ceases. Member 2 continues to rotate to lay the tape on layers of tape, previously disposed around the support member 3, in an anticlockwise direction. At this stage, in the operation of the apparatus, a second layer of tape in the form of a figure of 8 has been drawn onto the member 2 and supported by members 3 and 4.

It will be readily understood that continued oscillations of member 2 about the axis of shaft 5, combined with oscillations of member 2 parallel with the axis of shaft 5, will effect winding of the tape layer upon layer onto the support members 3 and 4. The coil of tape so wound may be readily lifted off support members 3 and 4 by lifting it off one first and then freeing it from the other.

It will be noted from FIGS. 3(*a*) to 3(*r*) that the angle of the tape, with respect to the horizontal, is constantly changing throughout the winding operation. This change of angle causes the guide member 22 in the region of the pin 25, to pivot about the axis of pin since the tape is sufficiently rigid to constrain the guide member 22 to move with it as the angle changes. In summarising operation of the apparatus, the combined effects of oscillation of the member 2 about the axis of shaft 5 and its oscillation parallel to the axis cause the tape to be drawn onto the member 2 and supported by members 3 and 4 carried thereon. During a first part of the cycle of oscillation, about the axis of shaft 5, rotation of member 2 between the positions in which it is shown in FIGS. 3(*a*) to (*g*) causes the tape to be partially wound around support member 4, whilst in the second part of the cycle of oscillation between the positions shown in FIGS. 3(*g*) to (*i*) the tape is partially wound round support member 3. The oscillations of the member 2 in directions parallel to the axis of shaft 5, ensures that the tape 1 is partially wound round the support member 4 in an anticlockwise direction, whilst oscillations of the member 2 in a direction parallel to the axis of the shaft 5, during the second part of the cycle of oscillation about the axis of shaft 5, ensures that the tape 1 is partially wound round the support member 3 in a direction reverse to that in which it is partially wound round support member 4.

A modification to the apparatus would permit the means for effecting oscillation of the member 2, parallel with the axis of shaft 5 to be dispensed with. Such a modification would include means for causing the guide 22 to oscillate parallel with the axis of the shaft 5, only in opposite directions, at the times stated. The tape 1 would then be wound round the support members 3 and 4 in the right directions to achieve winding of layers of figure 8 configuration.

It is to be understood that the foregoing description of specific examples of this invention is not to be considered as a limitation on its scope.

What I claim is:

1. Apparatus for winding tape in successive layers, each of said layers being in the form of a figure 8, comprising:

a frame;

a shaft, said shaft being rotatably and slidably mounted on said frame;

a plate secured to the end of said shaft with its face substantially perpendicular to the axis of rotation of said shaft;

first and second tape support members, said support members being mounted on said plate on either side of said axis of said shaft;

means for feeding tape to the plate-and-support-member assembly;

first means for imparting an oscillating rotational motion to said shaft;

second means for imparting an oscillating relative motion between said feeding means and said plate in a direction substantially parallel to the axis of rotation of said shaft and simultaneous with the oscillating motion imparted by said first means; and a source of motive power to drive both said first and second oscillating-motion-imparting means;

whereby the tape is partially wound around one of said support members in one direction during the first part of the cycle of oscillation, and partially wound around the other of said support members in a direction reverse to said one direction during the second part of said cycle of oscillation.

2. An apparatus according to claim 1 wherein said first and second tape support members are rotatably mounted on said plate.

3. An apparatus according to claim 1 wherein said second means includes third means for imparting an oscillating motion to said shaft in said direction substantially parallel to its axis of rotation and wherein said feeding means is stationary with respect to said frame.

4. An apparatus according to claim 3 wherein said feeding means comprises:

a flexible metal strip, said strip leading from a tape storage device to said plate and said strip being pivotally mounted to said frame at the end in close proximity to said plate and rigidly mounted to the tape storage device on the other end.

5. An apparatus according to claim 3 wherein said first and second means together comprise:

a motor mounted on said frame;

first and second cams rotatably mounted on the motor shaft;

a cam follower in communication with said first cam and pivotally mounted to said frame;

a pinion gear mounted on said shaft, the outer surface of said pinion gear defining an annular groove on one end;

said cam follower having a quadrant gear extension in engagement with the periphery of said pinion gear;

said gear and cam follower arrangement imparting said oscillating rotational motion to said shaft;

a lever pivotally mounted to said frame;

first and second studs, one of said studs being mounted on each end of said lever arm and being in communication with said annular groove and said second cam, respectively; and said pivoted lever arrangement imparting said oscillating motion to said shaft relative to said stationary feeding means in a direction substantially parallel to said axis of rotation of said shaft.

6. An apparatus according to claim 1 wherein said second means includes fourth means for oscillating said feeding means in a direction substantially parallel to the axis of rotation of said shaft and wherein said shaft is stationary with respect to the frame in the direction substantially parallel to said axis of rotation of said shaft.

References Cited by the Examiner

UNITED STATES PATENTS

| | | | |
|---|---|---|---|
| 2,130,520 | 9/1938 | Bockius et al. | 242—158.1 X |
| 2,275,544 | 3/1942 | Miller et al. | 242—53 |
| 3,044,614 | 7/1962 | Hanscom. | |

MERVIN STEIN, *Primary Examiner.*